Patented Aug. 15, 1933

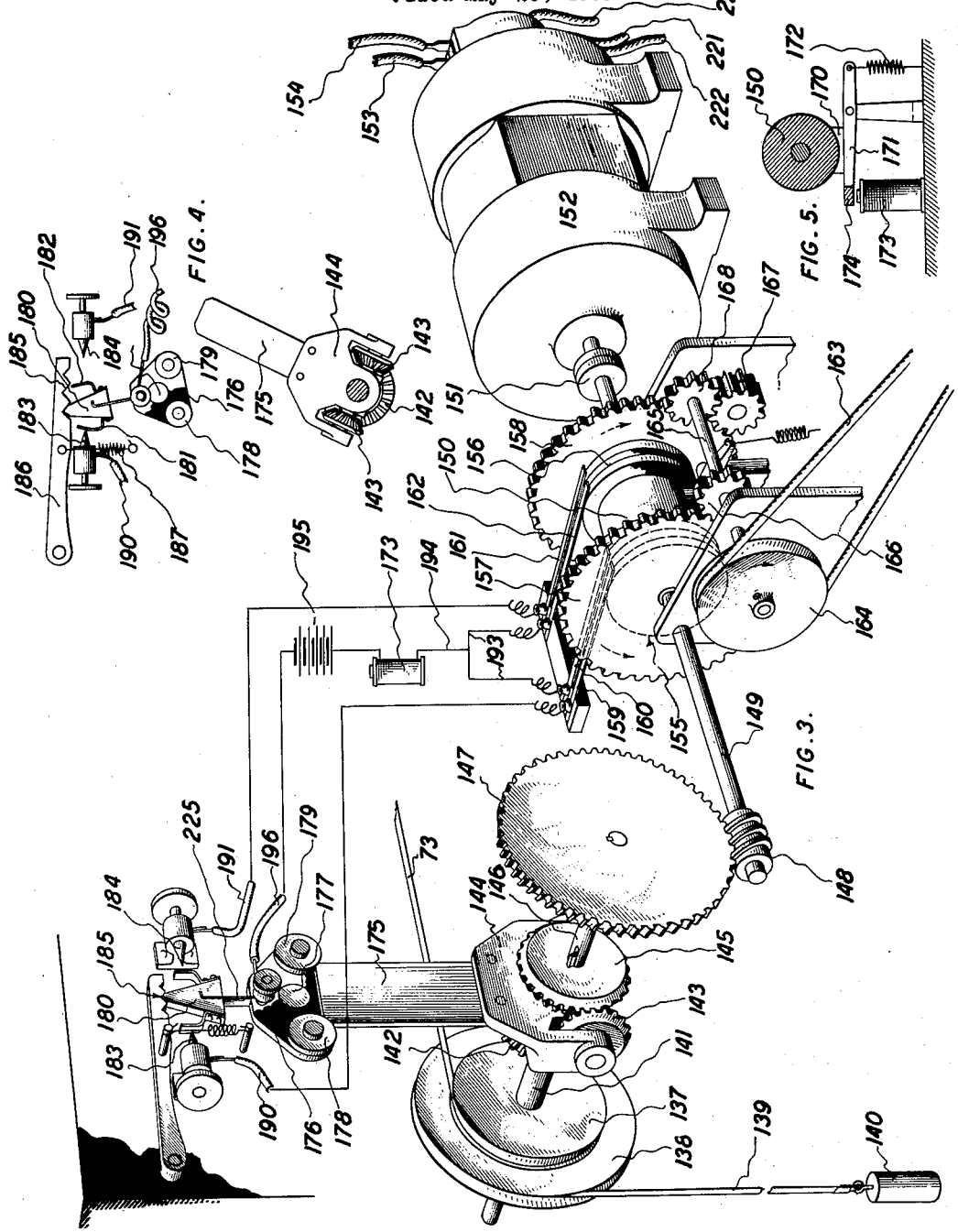

1,922,957

UNITED STATES PATENT OFFICE 1,922,957

APPARATUS FOR COMPUTING AND INDICATING THE RATIO OF VARIABLE QUANTITIES

George Alfred Julius and Awdry Francis Julius, Sydney, New South Wales, Australia Application May 28, 1931, Serial No. 540,734, and in Australia June 5, 1930

2 Claims. (Cl. 235—61)

This invention relates to improvements in apparatus for automatically computing and indicating progressively and continuously the ratio of two varying quantities or values such as that described in United States Patent No. 1,779,774, and it includes improved means for operating a plurality of distant indicators in synchronism with a primary or master indicator which is operated by the ratio computer. It also includes means for translating the rotary movement of a dial pointer to a straight line movement for a "Barometer" type indicator.

The invention has special utility in connection with betting totalizators. It is associated with these machines for the purpose of indicating to the public at different positions on a racecourse or elsewhere, and continuously during the operation of the totalizator, the "odds" which would be payable on each of the respective competing horses if the race were run at the moment at which the figures are read by the observer.

In the accompanying drawings:—

Figure 1:
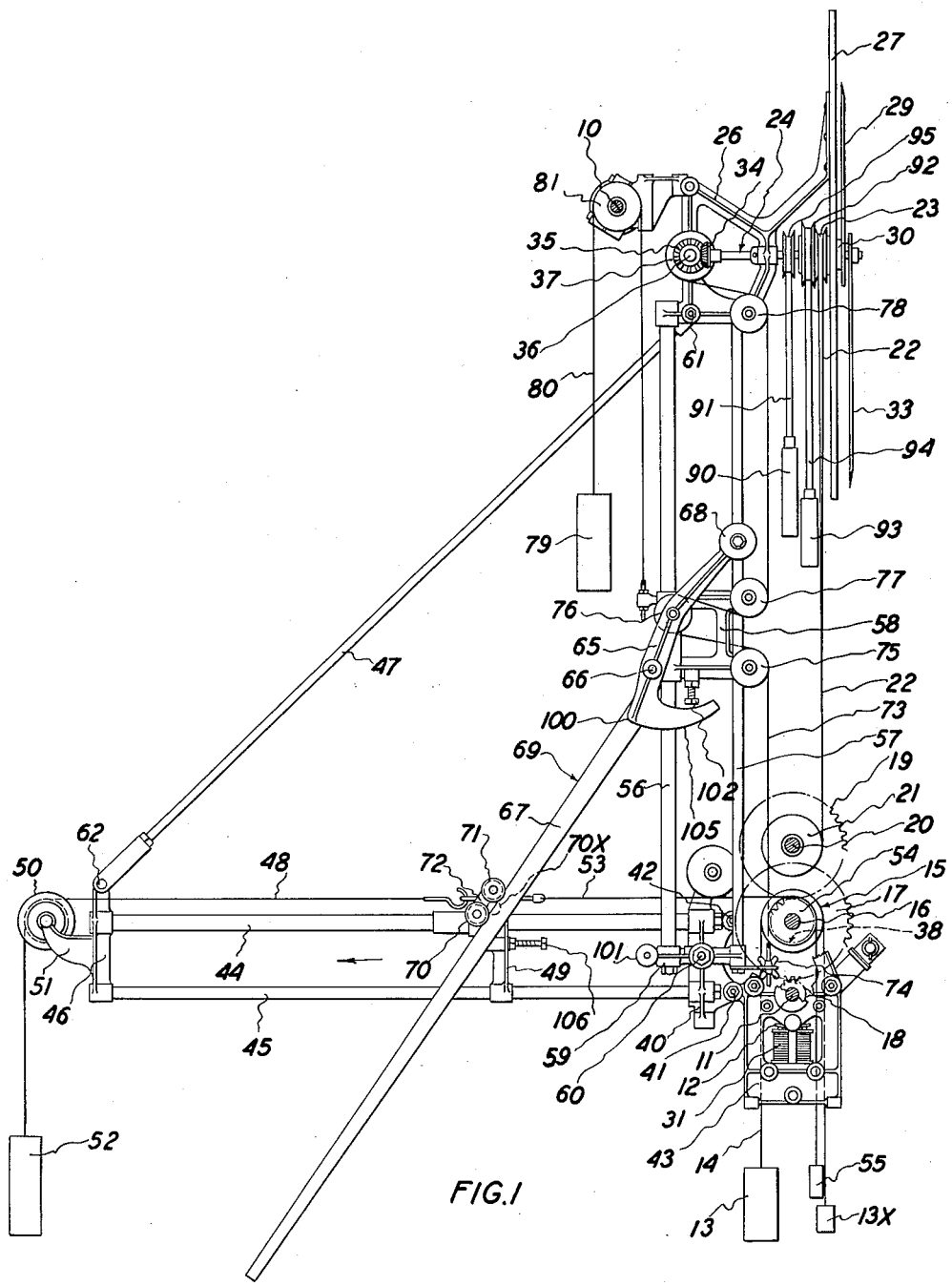
Fig. 1 is a side elevational view of a ratio computer and indicator in which the sought for ratio is displayed on a circular dial by means of a revolving hand.

Electro-mechanical driving means including a self-synchronizing motor by which several distant indicators are operated from a master indicator are illustrated in perspective view in Fig. 3;

Fig. 4 is a fragmentary elevational detail showing one of the contact making devices used in the Fig. 3 assembly in one of its extreme positions, the same device being shown in the mid (open circuit) position in Fig. 3; and Fig. 5 is an elevational view of an electromagnetic brake which is associated with the clutch barrel which is shown in Fig. 3.

Intercommunication between the master indicator and the associated distant indicators is effected through the medium of "Selsyn" self-synchronizing motors; these motors are well-known and extensively used devices which are so constructed and circuited that their armatures are caused to move synchronously through the same angles in a positive or negative direction obediently to the movement of the armature in a controlling "Selsyn".

In United States Patent No. 1,779,774, a ratio computer is shown in which a counterbalanced quotient arm has its movement controlled by two lead screws in right angle relation; one of these lead screws is driven from or in synchronism with a counter on which a grand total or dividend number is registered, and the other lead screw is similarly driven from the counter which registers a divisor number. In the indicator which forms part of the present invention, flexible lines take the place of these lead screws, and the quotient arm is operated against gravity instead of, as before, being caused to bear by gravity against a slider which is moved obediently to the progression of one of the lead screws.

In totalizator apparatus one such computer is provided for each horse and is operated by two driving elements. One of the driving elements is associated with the grand total counter of the totalizator and is common to all the computers in the system. The other driving element is operated from the individual competitor counter relating to the horse to which the particular computer is assigned.

The shaft 11 of the epicyclic gear train from the individual total counter is constrained to turn always in one direction by a weight 13 suspended on a line 14 which is wound over a pulley 15. The pulley 15 is fixed on a shaft 16 on which is also mounted a spur wheel 17; the spur wheel 17 meshes with a spur pinion 18 on the shaft 11. A counterweight $13^x$ hangs on the fall end of the line 14 to hold it in tension.

The weight 13 through the line 14 and gear wheels 17 and 18 constrains the epicyclic gear shaft 11 to turn, but free rotation of that shaft is checked by the escapements 12. When an electrical impulse is transmitted by the actuating mechanism to the magnet 31 one of the escapements 12 is actuated and the shaft 11 is permitted to turn, the angle of its rotation being governed by the tooth spacing of the particular epicyclic gear wheel which was released by the actuated escapement. The rotation of the shaft 11 is transmitted through the gear wheels 18—17 to the shaft 16.

40 is a bracket which is connected by bolts 41—42 to the frame 43 in which bearings are fitted for the shaft 11, the epicyclic gearing, the escapement mechanism 12, and the gear wheels 17 and 18. The bracket 40 carries two horizontal rails 44 and 45 which are supported at their outer ends in a bracket 46 which is stayed by a link brace 47. A line 48 fastened at one end to a carriage 49 which is slidably mounted on the guide rails 44 and 45 runs over a pulley 50 which is mounted on an arm 51 offset from the bracket 46. On the fall of the line 48 a weight 52 is hung; this weight constrains the carriage 49 to move along the rails 44—45 in the direction of the arrow. This movement of the carriage is restrained by a line 53 which is connected at one end of it to the carriage 49; its fall passes over a sprocket 54 which is fixed to the shaft 16, and a counterweight 55 holds it in tension. When the shaft 16 is rotated, consequent upon actuation of the escapement 12, the line 53 moves with the rotation of the sprocket wheel 54 and the weight 52 pulls the carriage 49 along the horizontal rails 44—45 in the direction of the arrow.

58 is a carriage slidably mounted on the vertical guide rails 56 and 57 which are fixed at the top ends in a frame 26 and at the bottom ends in a bracket 59 which is pivotally mounted at 60 on the bracket 40. The pivotal mounting arrangement is adapted to permit the assembly to be folded to facilitate safe transport without necessitating dismantling, and enables re-erection with minimum refitting in different locations. The vertical rails 56 and 57 are held in a position at right angles to the horizontal rails 44 and 45 by the link brace 47. By removing the nut 61, the link 47 can be swung on its pivot 62 until it lies parallel to the rails 44—45, and the rails 44—45 and the link 47 can then be swung on the pivot 60 until they come parallel with the vertical rails 56 and 57.

A counterweighted lever 65 which is pivotally mounted at 66 on the vertical carriage 58 carries the quotient arm 67 which is directed downward. 68 is the counterweight, the purpose of which is to balance the arm 67 with its left side edge 69 bearing against the face of two rollers 70 and 71, which are carried on a rocker arm 72 which is pivotally mounted on the horizontal carriage 49. The tangent from the faces of the wheels 70—71, represented by the edge 69 of the quotient arm 67 passes through the centre of the lever pivot 66 in all positions of the arm 67. A line 73 has one end of it held by an adjustable grip 74 on the bracket 59. This line runs over an idle wheel 75 on the carriage 58, and then round a wheel 76 which is journalled on the counterweighted lever 65 at some distance above its pivot 66. The line thence passes under another wheel 77 on the carriage 58, thence over a wheel 78 which is journalled on the top frame 26, and thence is wound over a drum 37 which is rotatable on a stud 36 on the top frame 26. 35 is a bevel wheel fixed on the side of the drum 37; this bevel meshes with a bevel pinion 34 which is fixed on one end of a spindle 24 which is rotatable in bearings in the frame 26. The other end of the spindle 24 passes through the centre of a dial 27 and carries a hand pointer 33. 90 is a weight suspended by a line 91 which is wound on a drum 92 on the spindle 24. This weight drives the spindle 24 and so causes the slack of the line 73 to be wound onto the drum 37, and also causes the quotient arm 67 to bear outward against the rollers 70—71.

79 is a weight suspended by a line 80; it runs over a pulley 81 which is fixed on the grand total transmission shaft 10. The other end of the line 80 suspends the vertical carriage 58. The weight 79 tends to draw the vertical carriage 58 upward along the vertical guide rails 56 and 57, but the sprocket wheel 81 can only move when the shaft 10 is freed for step-by-step rotation by the electro-mechanical escapements in the mechanism by which it is controlled. When connected to a race totalizator these escapements are actuated by the ticket issuers and they integrate the grand total of tickets issued on all the horses by all the ticket issuers in the system, in a manner well-known in the art. When the escapements permit the shaft 10 to move, the sprocket wheel 81 moves with it, and the weight 79, through the line 80, then pulls the carriage 58 upward. The quotient arm 67 bears against the rollers 70—71, and the lever 65 which carries it is tilted on its pivot 66 by the tension on the line 73. The line 73 is thus wound on the drum 37. The rotation thus applied to the drum 37 is transmitted through the bevel gears 34—35 to the spindle 24, thereby winding the line 91 onto the drum 95, and moving the pointer 33 in anti-clockwise direction around the drum 27. A circular dial is a convenient form of indicator, but a "Barometer" type or other lineal type of indicator may be used instead of a dial.

The edge 69 of the quotient arm 67 is held up against the rollers 70 and 71 by the tension on the line 73, and when the horizontal carriage 49 is moved to the left on the horizontal rails 44 and 45, the lever 65 is permitted to swing forward on its pivot 66. The weight 90 then drives the shaft 24 and winds the line 73 onto the drum 37, causing the pointer 33 to move in anti-clockwise direction. The resulting movement of the pointer 33 representing the integration of the vertical and horizontal movements of the respective carriages 58 and 49, displays the ratio on the dial which is appropriately figured on its face.

At the starting position the horizontal carriage 49 is slid close up to the bracket 40, and then the vertical carriage 58 is slid down to the bottom end of the vertical rails 56—57. The quotient arm 67 is then hanging vertically downward with its edge 69 bearing against the face of the rollers 70—71. In this position the heel 100 of the lever 65 is positioned immediately behind the roller 101 which is journalled in the frame 59. When electrical impulses are received by the magnets 31, the shaft 11 is turned as the escapements release it, and its movement is transmitted through the gearing 18 and 17 to the shaft 16. The pulley 54 is thus released, and the horizontal carriage 49 is moved by the weight 52 along the horizontal rails 44—45.

As the horizontal carriage 49 begins to move away from the zero position the vertical carriage 58 also begins to move upward, but the arm 67 is held in its vertical position for some time by the engagement of the curved heel 100 of the quotient arm lever 65 behind the roller 101, until the vertical carriage 58 has been moved upward far enough to lift the heel 100 clear of the roller 101. This arrangement is provided because at the zero position the pivot centre 66 of the vertical carriage is directly behind the rollers 70—71 and it is necessary that it should come above that position before lateral movement of the quotient arm commences. As the ascent of the carriage 58 proceeds, the face 105 of the lever 65 runs over the roller 101 and the quotient arm 67 is permitted to move out; it comes into contact with the rollers 70 and 71 gently, the face 105 being appropriately curved for this purpose. As the horizontal carriage 49 continues to move along the horizontal rails 44—45, the lever 65 is tilted. The weight 90 then turns the spindle 24, winding up the line 73 and moving the pointer 33 in anti-clockwise direction.

It is important that in all circumstances the operative edge 69 of the quotient arm 67 shall be in alignment with the axis of the pivot 66 and coincident with a radius through the centre of the pivot 70$^x$; otherwise correct angular movement of the quotient arm will not be obtained and the indicator will not display the ratio with precise correctness. The rocking carriage device 70—71 makes the necessary mechanical provision for ensuring the correct angular positioning of the arm 67 in correspondence with the relative positions of the carriages 58 and 49 on their respective guide rails 56—57 and 44—45.

The sought-for ratio which is displayed on the dial 27 is obtained by translation of the angular movement of the quotient arm 67; this angular movement depends upon the relative movement of the carriages 58 and 49 in angular relation along their respective guide rails. As these carriages are moved proportionately to the registrations on the grand total register and on an individual total register, angular position of the quotient arm 67 at any particular moment will correspond with the desired ratio, and the dial 27 will at all times display the ascertained ratio in simple figures.

The ratio is determined solely by the angular position of the arm 67 irrespectively of the extent of movement of the carriages 58 and 49 on their respective guide rails. Thus, for instance, if a ratio 1:1 is shown on the indicator dial when the arm 67 stands at 45°, it is of no account whether the carriages 58 and 49 are close up to or far distant from the zero position, for so long as the proportion between the grand total figure and the individual total figure is the same it is of no consequence whether these figures be large or small. Therefore, throughout the whole range of operation of the device a uniform condition prevails, that is to say, the angular position of the quotient arm 67 determines the ratio of the two numbers to be compared, and this angular position is translated onto the dial or other indicator.

In a race totalizator the epicyclic gearing on the shaft 11 integrates the impulses corresponding to the issue of tickets on one particular horse, but the shaft 10 registers the grand total of all the tickets issued on all of the horses. As the horizontal carriage 49 moves to the left in response to the actuation of the shaft 11, and the vertical carriage 58 moves upward in response to actuation of the shaft 10, the angular position of the quotient arm 67 is caused to vary as the relative position of the two carriages 49 and 58 progressively changes, and consequently, the line 73 is tensioned or slackened as the case may be, consequent on the outward or inward movement respectively of the pulleys 76 relatively to the pulleys 75 and 77; the dial pointer 33 is moved accordingly and indicates the changing ratio of the grand total in relation to the individual horse total.

If it is desired to show on the dial 27 the number of tickets issued on a particular horse, in addition to the odds, a pointer 29 is fixed on a tubular sleeve 30 which is freely rotatable over the spindle 24, and the dial 27 is marked accordingly. A drum 23 is fixed to this sleeve 30 and a line 22 which is wound on the drum 23 is fastened at its other end to a drum 21 which is fixed to a shaft 20 on which is also fixed a gear wheel 19. The gear wheel 19 meshes with a gear wheel 38 which is fixed on the shaft 16. The number pointer 29 is moved by the gearing 18—17—38—19 and by the line 22, independently of the bevel gearing 35—34 which drives the ratio pointer 33. The cord 22 is wound onto the drum 23 by means of a weight 93 which is hung on a line 94 fastened to a drum 92 which is fixed on the side of the drum 23.

At the end of a race, the escapements 31 of the individual total registers are reset at the zero position, and all the horizontal carriages 49 are moved back to the zero position, which is determined accurately by adjustable stops 106. The grand total register is then reset at zero and the shaft 10 is temporarily freed; all the vertical carriages 58 in the installation are then brought down to the lower ends of the vertical rails 56—57, their zero positions being determined by adjustable stops 102. In the zero position the heel 100 of the lever 65 which carries the quotient arm comes behind the check roller 101.

The drive for the shaft 16 is shown in the drawing as a weight 13 and chain 14 running over a sprocket wheel 15, a counterweight 13$^x$ holding the other end of the chain in tension. The wheel 15 is provided with a "free wheel" device to facilitate the re-winding of the weight. The chain 14 may be reeved over idler wheels or arranged in any other appropriate manner to provide for the outrun of an adequate length of chain and to facilitate re-winding of the weight. Alternatively, drive is applied to the shaft 16 through a slipping clutch.

The capacity of each unit can be increased by appropriately changing the size of the sprockets 54 and 81, so that the carriages 58 and 49 will be moved slowly along the rails 56—57 and 44—45 relatively to the grand totals and individual totals registered in the totalizator. In practice three sprockets are fitted on each of the shafts 10 and 16 and the chains 53 and 80 transferred from one to other of them to arrange the indicator for any race according to the foreseen volume of betting to be provided for. As it is absolutely essential that the same gear change shall be made in all the indicators, a check device is provided for holding the indicator apparatus inoperative until all the corresponding changes have been made. This check device is in practice an electrical circuit operating a relay fitted for operating a switch in the main driving circuit, the arrangement being such that the whole apparatus is cut out of circuit until all the corresponding changes are made and the relay circuit thus completed.

Means for reproducing the indicator figures at a plurality of distant positions and the means for translating the rotary dial movement to a straight line movement for a "Barometer" type indicator are shown in Figs. 2 to 5 of the drawings. The line 73 instead of being wound over a drum 37, as seen in Fig. 1, is wound over a drum 137, and another drum 138 which is fixed on the side of the drum 137 has a line 139 wound over it; the counterweight 140 thus corresponds functionally with the counterweight 90 (Fig. 1). The spindle 141 on which the drums 137—138 are keyed carries a bevel wheel 142. This wheel is meshed with a pair of planet wheels 143 in an epicyclic box; these planet wheels are journalled in a rocker box 144, and they mesh also with another bevel wheel 145 which is keyed on a spindle 146 which is in alignment with the spindle 141 but is independent of it. A worm wheel 147 is keyed on the outer end of the spindle 146 and a worm 148 on a spindle 149 is meshed with the worm wheel 147.

The spindle 149 passes through a clutch drum 150 and is coupled at 151 to the spindle of a Selsyn synchronous motor 152. 153 and 154 are the electric circuit input connections of this motor, and 220, 221, and 222 its output connections. 155 and 156 are electro-magnetic clutches associated with the drum 150. When these clutches are disengaged, the drum 150, which is keyed to the spindle 149, is not driven. The clutch 155 carries a spur wheel 157 on its driver element, and the driver element of the clutch 156 similarly carries another spur wheel 158. Current is supplied to the clutch 155 through the brushes 159 and 160, and current is supplied to the clutch 156 through the brushes 161—162. The spur wheels 157—158 are driven right hand and left hand respectively from the belt 163; this belt continuously drives a pulley 164 which is keyed on a countershaft 165; a spur pinion 166 keyed on this countershaft meshes with the spur wheel 157; a wide spur pinion 167 is driven by the second spur pinion 168 which is keyed on the shaft 165, and this wide spur pinion 168 meshes also with the spur wheel 158. Consequently when the belt 163 is in operation the driving members of the clutch 155—156 turn respectively in opposite directions, but only one or other of them can be clutched to the barrel 150 at any one time; no movement is applied to the spindle 149 through the drum unless one or other of the clutches is engaged. The drum 150 is fitted with a brake 170 (see Fig. 5); this brake is carried on a rocking arm 171 and is normally held engaged with the drum by a spring 172, the brake is pulled off by an electro-magnet 173, 174 being the armature of this magnet, carried on the beam 171. The tappet arm 175 of the rocker 144 which carries the planet pinions 143 coacts with a tumbler 176, 177 being a rocking pin on which this tumbler is carried. 178—179 are tappet rollers which are engaged by the tappet arm 175 according to the direction in which it is tilted. The tumbler 176 carries a click pawl head 180 on a flexible spring stem 225 which permits lost motion and this pawl head carries on the respective sides of it electrical spring contacts 181 and 182, 183 and 184 being fixed mating contacts with which the tumbler contacts 182—181 coact. The chisel-shaped tip of the click pawl 180 is engageable in either of three V-notches 185 in a spring latch 186, 187 being a pull spring which constrains the latch downwardly into engagement with the click pawl 180. 190 is an electric lead from the fixed contact 183 to the clutch brush 159, 191 is a corresponding electric lead from the fixed contact 184 to the clutch brush 161. The brushes 160 and 162 are cross connected by the leads 193 and a junction lead 194 from the leads 193 goes through the brake magnet 173 and thence to one pole of the battery 195; the other pole of the battery is wired to the click pawl 180.

When the indicator transmission belt 73 moves, the pulleys 137—138 turn, rotating the spindle 141 and turning the epicyclic drive wheel 142. The other wheel 145 of the epicyclic box being held steady, the rotation of the driver wheel 142 is applied to the planet wheels 143 and causes the rocker 144 in which they are journalled to tilt one side or the other according to the direction of movement of the spindle 141. When, for instance, it is thrown to the right as seen in Fig. 4, its tappet arm 175 strikes the tappet roller 179 and cants the tumbler 176 to the left; the pawl stem spring 225 is thus flexed, causing the pawl 180 to click from the centre notch 185 to the left hand notch in the latch 186 after some relative movement has occurred between the tumbler and the pawl and brings the spring contact 181 into engagement with the fixed mating contact 183. A quick make and break action is thus ensured. A circuit is thus established from the battery 195 through the lead 196, the pawl 180, contacts 181 and 183, and the lead 190, through the brushes 159 and 160, and thence by the leads 193 and 194 back to battery through the brake release magnet 173. The clutch 155 is thus energized simultaneously with the release of the brake 170 and the barrel 150 is turned, rotating the spindle 149 to which it is keyed and turning the armature of the Selsyn motor 152. The rotational movement thus applied to the spindle 149 is transmitted through the worm 148 and the worm wheel 147 to the back wheel 145 of the epicyclic rocker 144, and it operates to reverse the tilt of that rocker 144 and to bring the tappet arm 175 back to the vertical position, as seen in Fig. 3. As the tappet arm 175 comes to the vertical it strikes the tappet roller 178 and resets the tumbler 176 in vertical position, the pawl 180 clicking back into the middle or neutral notch 185 of the latch 186 and the circuit between the contacts 181 and 183 breaking, whereupon the drive to the spindle 149 is released and the brake 170 automatically comes into action at the same moment and checks over-running of the barrel 150 and the spindle 149. Every movement of the transmission belt 73 in either direction thus operates to throw the tappet arm 175 either to left or right and to complete a circuit which throws one or other of the drum clutches 155—156 into operation, thus applying rotational movement in either positive or negative direction to the armature of the Selsyn 152, and at the same time reversing the tappet arm 175, always bringing it back to the neutral position and at its neutral position releasing the drive to the Selsyn 152. All the Selsyns in the system being connected through the circuit lines 220, 221, 222 operate synchronously so that the movement of the armature in the control Selsyn causes the armatures of all Selsyns wired to it to move through the same angle.

Figure 2:
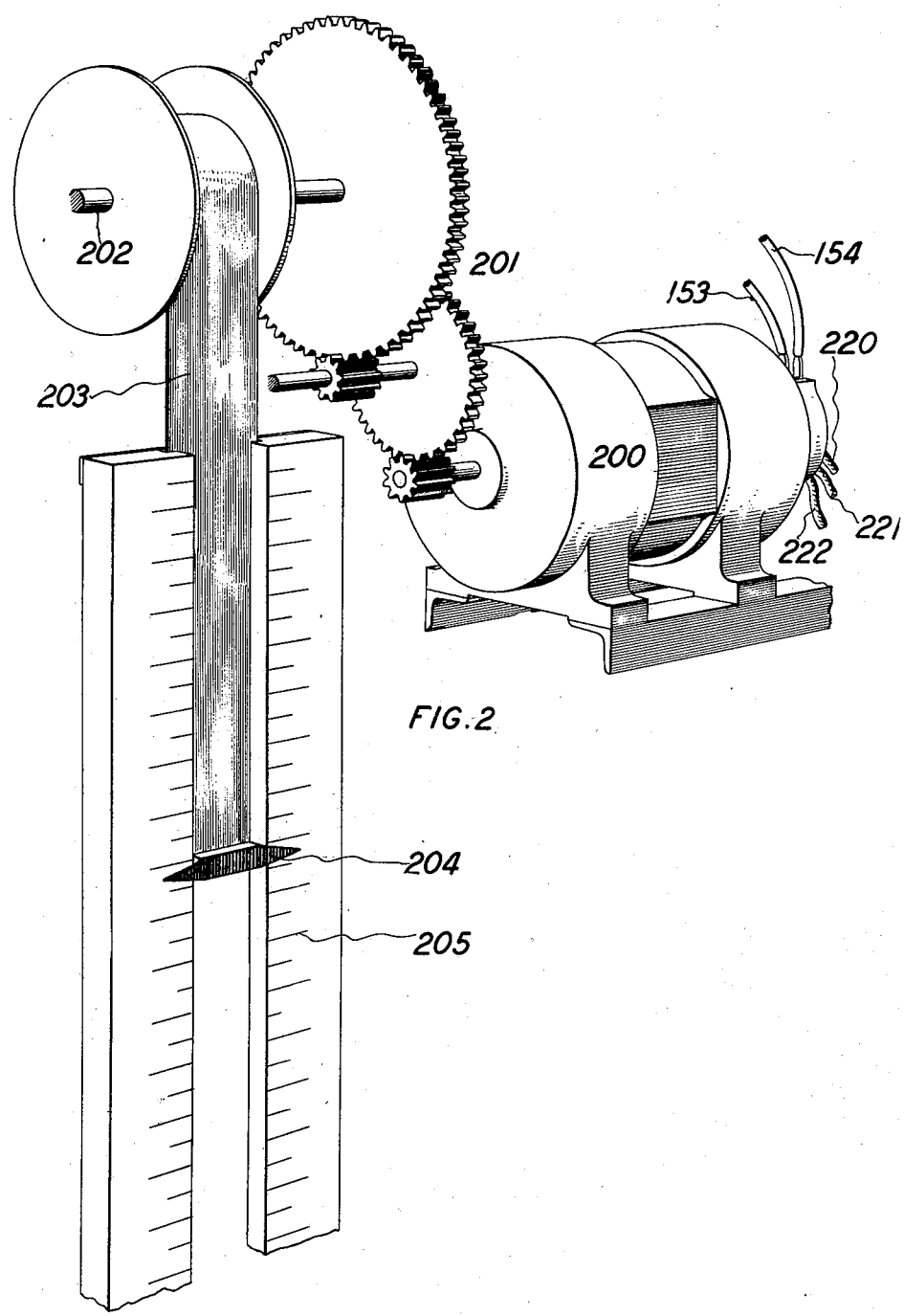
Fig. 2 is a perspective view of an indicator of the barometer type; any required number of indicators such as shown in this figure may be erected at different positions accessible on a racecourse or elsewhere for public observation, and connected with a master indicator for synchronous operation therewith.

One of the driven Selsyns is shown at 200 (Fig. 2). The spindle of this Selsyn is geared through a spur train 201 to the spindle 202 of a drum on which a pendent tape or strap 203 is wound. The bottom end of this strap or tape is weighted, the weight carrying a pointer indicator 204 which moves over a scale 205 which is figured appropriately according to the ratio of the gearing. In correspondence with the positive or negative movement of the armature of the Selsyn 200 the strap 203 is raised or lowered and the pointer 204 is thus brought to a position on the scale 205 which is figured to indicate the ratio required to be displayed.

When the distant indicators are of dial type (instead of "Barometer" type as shown in Fig. 2) the spindle 24 of the master indicator (see Fig. 1) is geared or belted to the shaft of a master Selsyn motor, and this master motor is electrically connected by its three coupling lines to a Selsyn motor in each distant indicator assembly. To minimize angular error the drive from the spindle 24 to the master Selsyn is 3:1 ratio, and the distant Selsyns are geared down 1:3 to bring the movements of the distant indicator hand to correspondence with the movements of the master indicator hand 33.

All the lines are preferably flexible metallic tapes, but they might be light chain belts, or flexible wires, or fabric tapes or cords.

It is important that there shall be no slip or lost motion in any part of the assembly, and to minimize risk in that regard sprocket metallic tapes may be used and sprocket wheels fitted instead of pulleys at the places where drive is applied to or taken from them.

What we claim as our invention and desire to secure by Letters Patent is:—

1. In varying ratio computing apparatus of the kind herein described, a stationary vertical runway, a stationary horizontal runway, a carriage slidable on each of said runways, flexible lines for applying traction to said carriages without lost motion, means for operating said lines proportionately to the quantities required to be ratioed, and a pendent arm coacting with said carriages to obtain the required ratio for transmission to an indicator.

2. In a ratio computing apparatus according to claim 1, a fixed check member, and a heel piece on the quotient arm coacting with said check member to restrain lateral movement of said arm when the carriages are at or near the zero position.

GEORGE ALFRED JULIUS.
AWDRY FRANCIS JULIUS.